Figure 1:
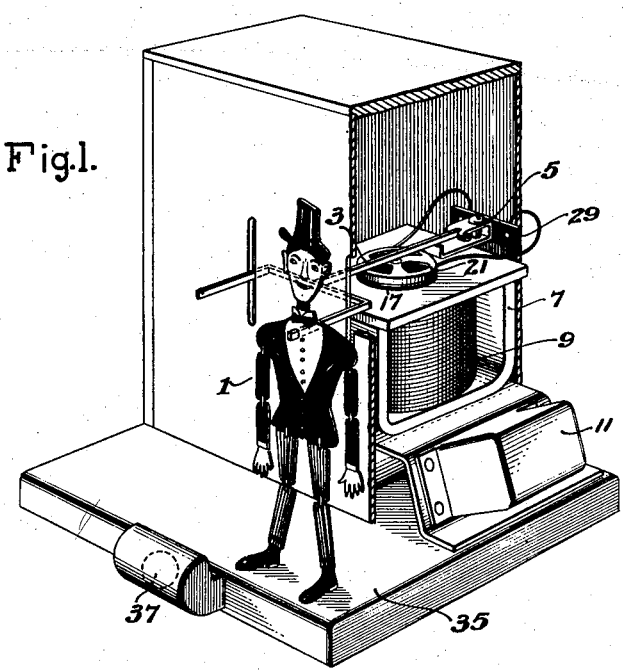

June 13, 1933.  J. S. HIGH  1,913,926
AMUSEMENT DEVICE
Filed April 17, 1931

INVENTOR.
Jurjen S. High,
BY
HIS ATTORNEY.

Patented June 13, 1933

1,913,926

UNITED STATES PATENT OFFICE

JURJEN S. HIGH, OF OAKLYN MANOR, NEW JERSEY, ASSIGNOR, BY MESNE ASSIGN-
MENTS, TO RADIO CORPORATION OF AMERICA, OF NEW YORK, N. Y., A CORPORA-
TION OF DELAWARE

AMUSEMENT DEVICE

Application filed April 17, 1931. Serial No. 530,818.

My invention relates to amusement devices and it has particular relation to animated toys and the like.

More specifically stated, my invention pertains to amusement devices of the type including a toy figure designed to imitate the movements of a performer when dancing in time to instrumental or other music, wherein the motive power for the toy and, also, the music is supplied from an amplifier that forms a part of an electric phonograph or of a radio receiver.

Rhythm in music is the regular recurrence of stress or accent. The rhythmic pulsation of a musical performance is usually indicated by the accentuated notes produced by low-pitched instruments and sometimes by an accentuation of the notes produced by higher pitched instruments. The audio frequency currents which issue from a radio or phonograph set amplifier when rhythmic music is played contain the rhythm in the form of trains of alternations of greater than average amplitude which occur at definite intervals.

A living person, when dancing, executes movements in accordance with the rhythm of the music and not, as a rule, in accordance with the occurrence of the separate notes sounded in the intervals between the beats. A toy figure, therefore, if the illusion of an actual performance is to be conveyed to the observer, should dance in time with the aforementioned trains of alternations and should be relatively unresponsive to the separate alternations.

I am aware that it has previously been proposed to actuate small toys such as dolls or marionettes by electric impulses derived from an appropriate source. Such devices are exemplified by British Patent #10,470 of 1912 and by U. S. Patents Nos. 171,216, 1,280,307, 1,726,283 and 1,726,294.

It is apparent, however, upon careful consideration of the devices proposed prior to my invention, that they fail to properly simulate the actual movements made by a living performer when dancing to instrumental music and that, consequently, the illusion conveyed by them to the observer is imperfect.

It is, accordingly, an object of my invention to provide an animated toy that shall effectively simulate the movements of a living performer.

Another object of my invention is to provide an animated toy capable of movement in synchronism with the rhythm of sounds derived from a phonograph record or the like.

A still further and more specific object of my invention is to provide a "dancing doll" or the like that shall be preferentially responsive to the rhythm of the sounds corresponding to electric currents utilized for its actuation and relatively unresponsive to unaccentuated notes.

A careful investigation of the problems to be solved in the design of a satisfactory dancing toy has indicated to me that the following requirements should be met:

(1) The device should be motivated by impulses conveyed by mechanism, aperiodic in character or having a long natural period, wherein the restoring force is slight;

(2) The currents representing the music should be rectified, or the driver for the toy should provide "motional rectification", in order that the device shall be preferentially responsive to the rhythm of the music;

(3) Means must be provided for exerting a choking effect on audio frequency currents of large amplitude and long duration.

The manner in which my improved amusement device meets the foregoing requirements will hereinafter become apparent.

An amusement device constructed according to my invention comprises a loosely jointed toy figure and means for conveying unidirectional impulses thereto in accordance with music. Preferably, the figure is so supported from a pivoted lever-arm that the weight of the lower limbs is partially carried by a platform or stage. Motion is imparted to the lever-arm from a driver, similar, in some respects, to a loudspeaker driver of the electrodynamic type, which may be supplied with energizing current from an audio frequency amplifier or from any other convenient source of fluctuating current.

The manner in which the device is rendered preferentially responsive to the rhythm or tempo of the energizing current is an important feature of my invention; it results from the utilization of a new principle, insofar as the actuation of toy figures and the like is concerned, which principle was above designated "motional rectification".

Figure 2:
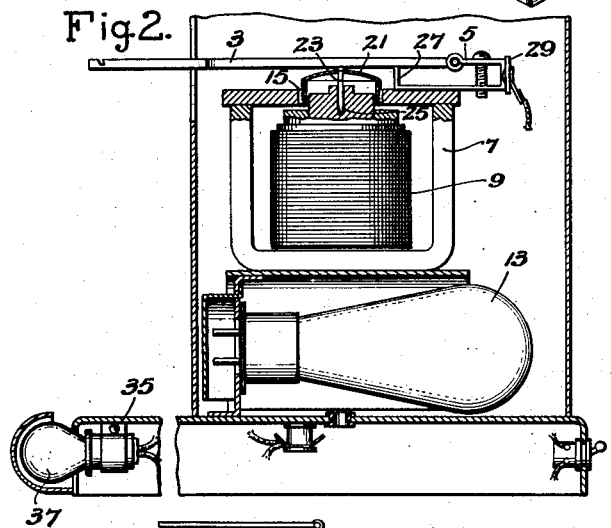
Figure 3:
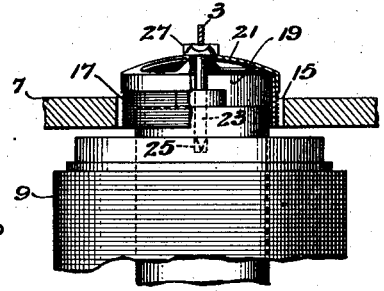
Figure 4:
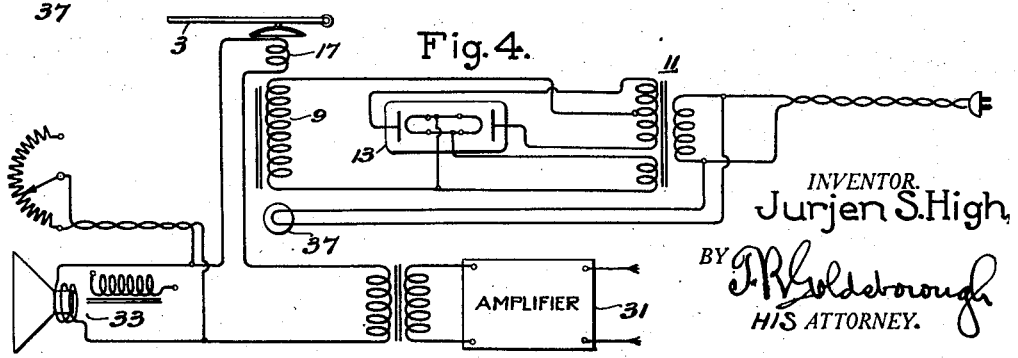

The novel features that I consider characteristic of my invention are set forth with particularity in the appended claims. The invention itself, in its entirety, both as to its organization and its method of operation, together with additional objects and advantages thereof, will best be understood from the following description of a specific embodiment when read in connection with the accompanying drawing, in which Fig. 1 is a perspective view of an amusement device constructed according to my invention, Fig. 2 is an end view of the motive device, Fig. 3 is an enlarged view, partly, in section of a portion of the driver, and Fig. 4 is a circuit diagram showing one manner in which my improved amusement device may be supplied with energizing potentials.

The apparatus illustrated in the drawing comprises a toy figure 1, constructed of light material such as cardboard or the like, which is suspended from the free end of a light lever-arm 3, the opposite end of which is loosely pivoted in a bracket 5. The limbs and head of the figure are loosely jointed. Preferably, the pivoted arm 3 is made of aluminum and it is slightly flexible both horizontally and vertically. The arm may be bifurcated, as illustrated, for the support of an additional figure (not shown).

The driver, which supplies impulses to the lever-arm, includes an electromagnet 7 having a field winding 9. Energizing potential for the field winding may be supplied from any available AC source. I find it expedient, however, to provide means whereby such potential may be derived from the nearest convenient lamp socket. The complete device, therefore, includes a power transformer 11 and a rectifier such as, for example, a thermionic device 13 of the type commercially known as Radiotron UX-280. A permanent magnet may, of course, be substituted for the electromagnet, if desired.

The poles of the electromagnet are so shaped as to provide a circular air-gap 15. A voice-coil 17 is disposed in the air-gap, the coil being wound upon an insulating form 19 which is suspended from a spider 21 of non-magnetic material. A centering pin 23 depends from the spider and slidably engages a small opening 25 formed axially in the upper end of the central pole piece. The pin, in the absence of current in the voice-coil, rests on the bottom of the opening to provide a rigid stop for downward movements thereof.

The bracket 5, in which the lever-arm is pivoted, is mounted upon the electromagnet, the said bracket being so disposed that the arm 3 extends diametrically across the upper surface of the spider 21, which surface is slightly concave, the axis of the concavity being parallel to the lever-arm.

An abutment device 27 is disposed beneath the lever-arm intermediate the spider and the pivot, the height of the abutment being such that the lever-arm and the spider are maintained out of contact with each other when no current flows in the voice-coil. It also lies within the scope of my invention to provide clearance between the spider and the lever-arm through the use of any other convenient means. In certain instances, also, depending upon the material from which the lever-arm is made and upon other factors, I find it advisable to omit the abutment device.

The terminals of the voice-coil are brought out to a suitable terminal board 29, mounted upon the electromagnet, for connection to any suitable source of current at audio frequency. Such source may be provided, as shown in Fig. 4, by an audio frequency amplifier 31 of an electric phonograph or of a radio receiver in which event the voice-coil may be connected either in series or in parallel with a loudspeaker 33 energized from the said amplifier, the mode of connection being determined by the relative impedances of the voice-coil and the source of the current.

The distance between the free end of the lever-arm 3 and a platform 35, provided with a foot-light 37, which forms a part of the device, is so correlated to the dimensions of the toy figure that, in the absence of energizing current in the voice-coil, the weight of the lower limbs of the figure is partially carried by the platform.

As was stated above, the successful operation of the electro-dynamically driven doll depends on not having any centering means which will exert a return force on the moving coil. When the coil of the ordinary electro-dynamic loudspeaker has a simple harmonic current flowing through it, the loudspeaker diaphragm executes corresponding simple harmonic motion. When a simple harmonic current flows through the coil which has been described for the doll mechanism the motion is far from simple harmonic.

In the first place, when in its rest position with no current flowing, the coil is held by gravity, with the pin resting on a rigid support, so that it is free to move upwards and not downwards. When operation starts, the force exerted by the coil will push the lever supporting the doll upwards for a certain distance and then as the current reverses the coil will start on a downward path. This downward course is soon interrupted, however, by having the pin strike the base of its support and if the pin and base are elastic enough the downward momentum will be transferred into upward momentum, which will give the doll lever an additional impulse. It has been found that this change in momentum without loss is important for the most successful operation of the doll.

When material was placed in the pin support so as to eliminate some of the noise of operation with consequent absorption of energy at the time when the pin strikes the base, the response of the dolls was considerably less lively.

When a continuous wave of low frequency is impressed on the coil, it will be found that the coil will no longer remain in the gap but will rise and oscillate about a new position such that the larger part of its windings are outside of the stronger part of the magnetic field of the polepieces. This effect is made possible by the unconstrained vertical motion of the coil and is due to the tapering nature of the transverse magnetic field.

It will be found that the distance moved by the coil in an upward direction is considerably greater than the distance moved through in a single oscillation; thus, giving added motion to the lever 3. It will also be found that the amplitude of oscillation of the coil when it is in this raised position is much less than it would be if in the stronger part of the field. We thus have automatically two effects which are desired. The first is rectification action in which oscillations are transformed into motion in a single direction. The second is choking action in which oscillations which extend over periods of time are materially reduced in amplitude after the first few cycles.

The exact solution of the equations of motion of a cylindrical coil of wire in a transverse magnetic field, the strength of which decreases as we move outward in space, is very difficult. An approximate solution may, however, be obtained which is suitable for the purpose of explaining this action.

If $m$ is the mass of the coil, $x$ is the distance in a vertical direction measured from some fixed origin, $I_o \sin pt$ is the current through the coil, $k$, the length of wire in the coil, and $F(x)$ represents the transverse field strength as a function of the distance above the zero of coordinates, the equation of motion of the coil is then exactly as specified by:

$$m\frac{d^2x}{dt^2} = I_o k F(x) \sin pt - mg$$

where "$g$" is the gravitational constant.

As mentioned above, this equation is not amenable to simple mathematical treatment. The problem is simplified by assuming a field which decreases linearly rather than one which decreases in a general manner, and the essential points will be brought out if this assumption is made. $F(x)$ will be taken as the form $A - ax$. With this simplification, the above equation becomes:

$$m\ddot{x} = I_o k (A - ax) \sin pt - mg$$

This equation is still not in a form to give a simple solution and it is well to consider the physics of the motion before proceeding further with the mathematical solution. When a coil of the kind described moves in a magnetic field under the influence of simple harmonic currents, the upward acceleration is imparted to the coil during the lower half of the displacement cycle, while the downward acceleration is imparted to the coil during the upper half of the displacement cycle.

If the magnetic field is weaker in an upward direction, the downward acceleration given to the coil will not be as great as the upward acceleration and the coil will tend to move upward until it reaches a field of such intensity that the excess of upward over downward acceleration is balanced by the acceleration of gravity.

An approximate determination of the upward force on the coil may be obtained by assuming that it is constrained to move in a simple harmonic fashion over a single cycle and by computing the upward force on the basis of this motion. Suppose that $A_o$ is the transverse field strength at the point $x_o$ about which the coil is oscillating. If the field were uniformly of that strength the motion would be:

$$x = x_o - \frac{A_o k I_o}{p^2} \sin pt$$

The forces acting on the coil going through this motion in the non-uniform field are determined by substituting for $x$ in $$k I_o (A - ax) \sin pt$$

giving the result:

$$k I_o (A - ax_o) \sin pt + \frac{k^2 I_o^2 a A_o}{p^2} \sin^2 pt$$

The second term can be reduced to:

$$\frac{k^2 I_o^2 a A_o}{2p^2} - \frac{k^2 I_o^2 a A_o}{2p^2} \cos 2pt$$

representing a force upwards plus a second harmonic term.

If a more exact result were required, it could be obtained by substituting this motion in the equation and proceeding by a method of successive approximations. Since, however, the main facts are shown by this result, no attempt will be made for further refinement.

Inspection of the last equation shows that the upward force which is developed by the motion in the non-uniform field depends on the amplitude of motion which would take place if the field were uniform and approximately of the strength of the field at the center of motion and on the rate of change of the field as determined in this case by the parameter, $a$. Since the amplitude of motion of a mass-controlled body is inversely proportional to the square of the frequency, much greater upward thrust can be expected at low frequencies. That this result is correct is shown by an experiment in which a current of constant magnitude but of varying frequency is imposed on the coil. As the frequency is lowered, the coil oscillates with more and more of its windings out of the field structure. At any frequency it will move upwards until its amplitude of motion is so reduced due to oscillating about a position in a weaker field that the upward force generated due to the motion will just equal the downward force due to gravity.

In this manner a succession of harmonic waves which are really of too high a frequency to give the dolls a desirable motion are translated into an upward motion of the coil. After the upward motion has taken place the coil is in a weaker magnetic field so that its oscillation due to musical frequency components is much reduced and miscellaneous undesirable rattles due to the same motion are, therefore, eliminated. The motion of the coil coincides with rhythm frequency rather than voice frequency.

In addition to conveying vertical impulses to the figure still further realism may be obtained by causing the said impulses to have a component directed at an angle to the vertical movement of the voice-coil. This result is attained by the concavity provided in the upper surface of the spider.

It will be apparent from the foregoing description of my improved amusement device that the "motional rectification" provided by the driver constitutes a radical improvement in the art of animated toys. The impulses conveyed to the toy figure are unidirectional, they have sufficiently high amplitude to motivate the figure, and they are variegated in character. As a consequence, the arms and head of the figure move in perfect synchronism with the tempo of the music, while the lower limbs execute a sort of shuffle interrupted at intervals by eccentric dance steps corresponding to the more violent impulses conveyed to the lever-arm. Objectionable noises are not present, yet there is a slight clicking sound which very effectively simulates the effect of tap-dancing.

Although I have illustrated and described a specific embodiment of my invention, numerous modifications thereof will be apparent to those skilled in the art to which it pertains. My invention, therefore, is not to be restricted except insofar as is necessitated by the prior art and by the spirit of the appended claims.

I claim as my invention:

1. In combination, a magnetic structure defining an air-gap, a movable conductor disposed in said gap, a pivoted support for a toy figure and means for conveying motion from said movable conductor to said support, said motion-conveying means being biased away from said support in the absence of current in said conductor.

2. The combination as set forth in claim 1 characterized in that the toy figure is connected to the pivoted support at a point adjacent to the center of gravity of the said figure.

3. The combination as set forth in claim 1 characterized in that the weight of the movable conductor and the motion-conveying means supplies the biasing force.

4. The combination as set forth in claim 1 characterized in that the motion-conveying means is so constructed as to convey impulses to the pivoted support in a direction at an angle to the direction of movement of said means.

5. In combination, a loosely jointed toy figure, means providing a platform on which said figure is adapted to stand, and means for conveying to said figure unidirectional impulses in accordance with rhythm in music, said means including a magnet having an air gap, a coil having a position of rest from which it is freely movable in said air gap in one direction, a circuit connection with the coil for applying directly thereto a fluctuating electric current corresponding electrically to rhythmic musical sounds, a spider arranged to carry said coil, a pivoted resilient lever arranged to contact with said spider when said coil moves in said air gap and being adapted to pivotally support said toy figure in operative relation to said platform.

6. In combination, a loose-jointed composite toy figure comprising articulated limbs and body members, a platform, a pivoted lever providing a suspension means for said figure, stop means contacting with said lever for normally so holding the figure with respect to said platform that the weight of the lower limb members of the figure is partially removed from the joints for the said limbs, a coil, means providing a magnetic air gap in which said coil is freely movable in one direction from a position of rest, a rigid stop arranged to prevent movement of the coil in the opposite direction, means connected with the coil for contacting with the pivoted support for the figure to provide an intermittent driving connection therewith, and a circuit connection with the coil for applying directly thereto a fluctuating electric current corresponding electrically to rhythmic musical sounds.

7. In combination, a loose-jointed composite toy figure comprising articulated limb and body members, a platform, a pivoted lever providing a suspension means for said figure, a coil, means providing a magnetic air gap in which said coil is freely movable in one direction outwardly thereof from a position of rest, a rigid stop arranged to prevent movement of the coil in the opposite direction, means connected with the coil for contacting with the pivoted support for the figure to provide an intermittent driving connection therewith, a spider arranged to carry said coil, said lever being arranged to contact with said spider when said coil moves out of said air gap and being adapted to pivotally support said toy figure in movable contact relation to said platform, and said coil having terminals adapted to receive directly a fluctuating electric current corresponding electrically to rhythmic musical sounds.

8. An apparatus for visibly indicating rhythmic pulsations in audio frequency electrical currents corresponding electrically to rhythmic musical sounds, including in combination, an elongated lever arranged to lie substantially horizontally and pivoted adjacent to one end thereof, a loosely jointed figure adapted to be animated by vertical motion provided with an articulated connection with and adapted to depend from the opposite end of the lever, a platform means for normally partially supporting the figure in cooperation with the lever, a movable electrical coil, means providing a magnetic field from which the coil is movable in one direction from a position of rest therein, means providing a driving connection between the coil and the lever for raising the lever when the coil is energized, stop means for the lever and independent stop means for the coil for limiting movement of the lever to a single direction in which the coil drives the lever, and circuit means for applying directly to the coil audio frequency currents to be translated by said apparatus into motion of said figure.

9. In apparatus for visibly indicating rhythmic pulsations in audio frequency electrical currents corresponding electrically to rhythmic musical sounds, including in combination, an elongated lever arranged to lie substantially horizontally and pivoted adjacent to one end thereof, a loosely jointed figure adapted to be animated by vertical motion provided with an articulated connection with and adapted to depend from the opposite end of the lever, a platform means for normally partially supporting the figure in cooperation with the lever, a movable electrical coil, means providing a magnetic field from which the coil is movable in one direction from a position of rest therein, means providing an intermittent driving connection between the coil and the lever for raising the lever when the coil is energized, stop means for the lever and independent stop means for the coil for limiting movement of the lever and coil from a normal position of rest to a single and the same direction in which the coil drives the lever, said stop means for the lever being adjacent to the pivoted end thereof and the stop means for the coil being arranged to permit the coil to move freely out of the magnetic field in said single direction and said driving connection between the coil and the lever being such that the lever is movable away from the stop means provided therefor independently of movement of the coil, and circuit means for applying directly to the coil audio frequency currents to be translated by said apparatus into motion of said figure.

10. In combination, a toy figure, means for deriving unidirectional impulses from fluctuating electric current, and means for utilizing said impulses to animate said figure, said impulse deriving means including elements constituting a magnetic circuit having an air gap wherein is disposed a movable conductor for the fluctuating current.

11. In combination, a mechanical device to be animated, means providing a magnetic air gap, means, including a movable coil in said air gap, stop means for holding the coil against movement through said air gap in one direction and a circuit connected with said coil for applying fluctuating electric currents thereto, for applying forces to the coil to move it with non-uniform linear motion alternately away from and toward said stop means in response to said currents when flowing in the coil, whereby said force moving the coil away from the stop means is greater than the initial force moving the coil toward the stop means, and means for intermittently applying said forces to said device through movement of said coil.

12. In combination, a mechanical device to be animated, means for producing a magnetic field, means, including a movable coil in the field, an alternating signal current supply circuit connected with said coil and stop means for the coil limiting the movement of said coil from said field to one direction, for causing a reaction between said coil and said magnetic field in response to an alternating signal current applied to said coil, whereby the force of the reaction is applied to the coil to move it alternately away from and toward said stop means, and whereby said force moving the coil away from the stop means is greater than the initial force moving the coil toward the stop means, and means for applying the moving force of said reaction to said mechanical device.

13. A device for producing motion corresponding to alternating signal currents, comprising in combination, a field magnet, a coil lying in the field of said magnet and being movable therein in response to said signal currents, a stop means for limiting in one direction the movement of the coil in the magnetic field, circuit means for applying alternating current signals to said coil to alternately move said coil away from and toward said stop means, whereby said force moving the coil away from the stop means is greater than the initial force moving the coil toward the stop means, a mechanical device to be animated, and means providing an articulated connection between the coil and said device.

In testimony whereof, I have hereunto subscribed my name this 9th day of April, 1931.

JURJEN S. HIGH.